UNITED STATES PATENT OFFICE.

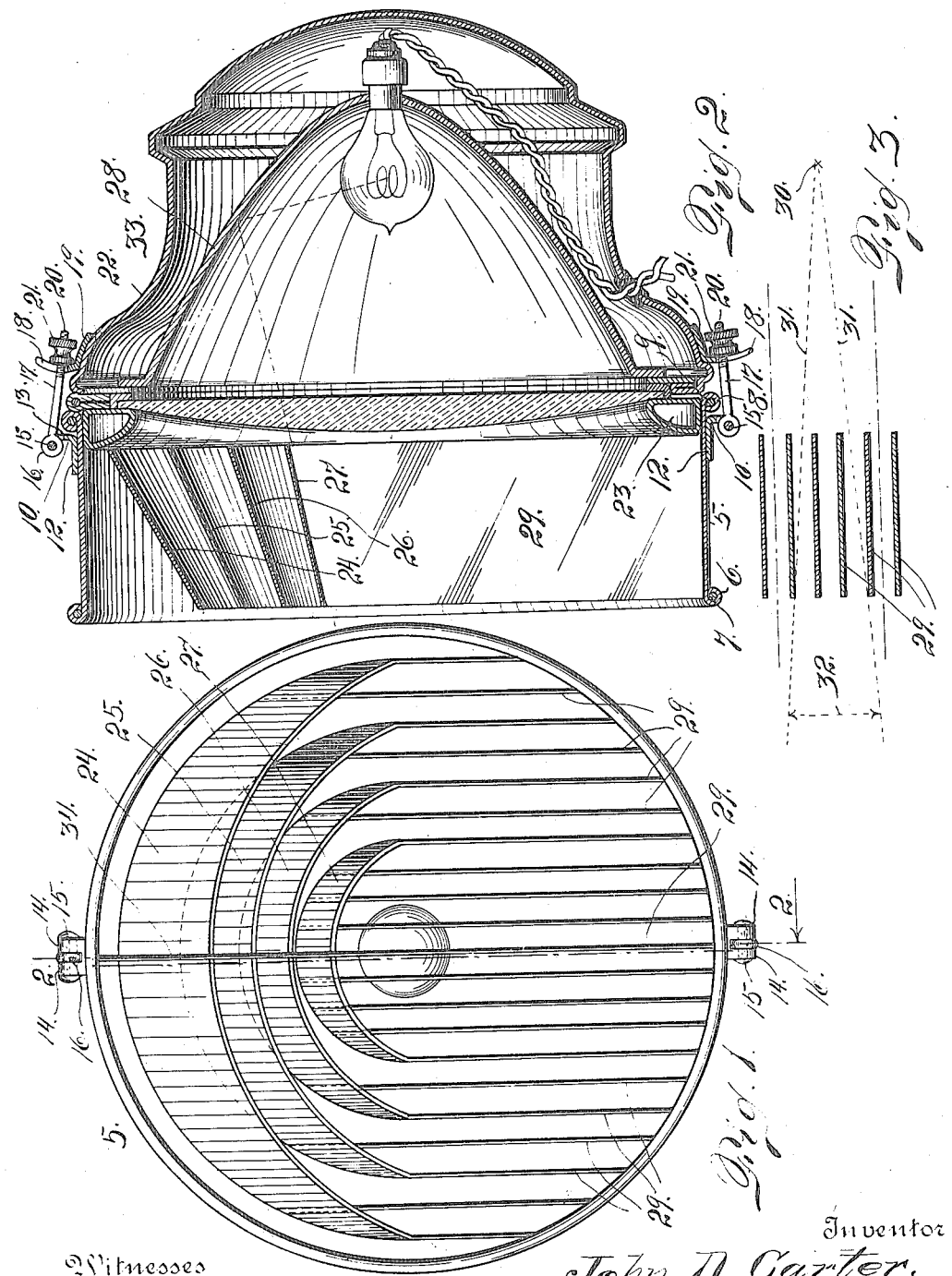

JOHN D. CARTER, OF DENVER, COLORADO.

AUTOMOBILE LAMP-DIMMER.

1,148,354.  Specification of Letters Patent.  Patented July 27, 1915.

Application filed November 23, 1914. Serial No. 873,431.

*To all whom it may concern:*

Be it known that I, JOHN D. CARTER, a citizen of the United States, residing at the city and county of Denver and State of Colorado, have invented certain new and useful Improvements in Automobile Lamp-Dimmers; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for dimming the light of lamps employed on automobiles and other vehicles, my object being to provide a construction adapted to comply with the requirements of the ordinances in certain cities, prohibiting the use of the exceedingly brilliant lights which have heretofore been carried by automobiles, owing to the fact that these lights, being of dazzling brightness, result in blinding the eyes of pedestrians and others to such an extent as to produce or result in accidents. It is important that a device of this character, while adapted to perform the light dimming requirement, shall at the same time, so far as is practicable, result in as little loss of light as possible. In other words, it is not so much a diminution of light that is required, as that the light of the lamps be thrown downwardly upon the ground, as the surface of the street or road in front of the machine, in order that the driver or chauffeur may have the necessary illumination to enable him to see a considerable distance in front of the machine, and thus prepare to steer the machine in the event of short turns or in case other machines or vehicles are in front of him. Hence, an important object of my improvement is to provide a device which, while performing the dimming requirement, shall at the same time be of such character as to conserve to a large extent the entire illuminating power of the lamps. Lamp dimmers, as heretofore constructed or arranged, so far as I am aware, have been designed with one object alone in view, namely, to direct the rays from the upper half of the reflector or the half above the horizontal axis of the lamp, downwardly upon the street, leaving the light of the lower half of the lamp entirely unobstructed. In my improvement, I provide for dimming the entire light from the lamp, and at the same time, conserve as far as is practicable, the entire illumination for the better lighting of the road or street in front of the machine; to this end I employ a cylindrical casing adapted to be readily attached to the forward part of the lamp; in this casing, I place a series of baffle plates whose upper portions or the portions in the upper half of the casing are semicircular in shape and inclined downwardly from the rear toward the front, the inclination of the said plates varying in degree, so that all of these plates from the lowermost to the uppermost shall have a tendency to deliver the rays of light upon the ground and at the same or approximately the same distance in front of the machine. In the lower half of this casing, these plates are vertically disposed and arranged in parallel relation, the number of plates in the lower half of the casing being greater than on the upper half, though the two sides of the plates are connected together, as this arrangement is best adapted to form a substantial and durable article. By virtue of the fact that the plates in the lower half of the casing are vertically disposed and in parallel relation, and that there is a considerable number of them, whereby they are placed reasonably close together, it is impossible for the direct rays from the main reflector to escape from the dimmer except from a comparatively small central area in front thereof. Hence, if a person was in position to receive the rays directly reflected from the lower half of the main reflector, these direct rays could only be seen when occupying a position approximately directly in front of the center of the lamp. In other words, as soon as the person in front of the lamp moves slightly to one side of the center in either direction, these directly reflected rays no longer strike the eye, with the result that the illumination in front of the machine, while sufficient for all practicable purposes, has not the result of directly reflected rays, and consequently, cannot reach the eye of the person with such strength as to be annoying or blinding.

Having briefly outlined my improved construction, I will proceed to describe the same, reference being made to the accompanying drawing, in which is illustrated an embodiment thereof.

In this drawing, Figure 1 is a front detail view of my improved lamp dimmer. Fig. 2 is a section taken on the line 2—2, Fig. 1, illustrating the dimmer applied to an automobile lamp. Fig. 3 is a diagrammatic view illustrating a number of the vertically disposed parallel plates belonging to the lower half of the dimmer. In this view, the plates are shown in horizontal section and in plan view.

The same reference characters indicate the same parts in all the views.

Let the numeral 5 designate the cylindrical casing of my improvement. The front edge of this casing is formed into a bead 6 which is turned around a strengthening wire 7 in the ordinary way. The rear edge of this casing is also provided with a similar bead or rib 8, including a strengthening wire 9. Applied to the rear portion of the casing at the top and bottom, are two angular brackets 10, whose horizontal parts 12 are soldered or otherwise secured to the casing, while their parts 13 which extend outwardly from the casing, are bifurcated, forming parts 14, which are formed into eyes or perforated to receive a connecting pin 15, which also passes through an eye 16 of a bolt 17, whose rear portion enters the slot 18 of a bracket 19 secured exteriorly to the lamp casing 22. The threaded portion 20 of this bolt extends rearwardly of the bracket and a securing nut 21 is applied thereto. By virtue of this construction, the dimmer is secured to the automobile lamp in such a manner as to be readily detachable. The lamp is provided with a lens-holding collar 23 surrounded by the rear extremity of the casing 5, said collar forming a substantial bearing surface, whereby, as the screws 21 are tightened on the bolt 17, the casing may be securely connected with the lamp in such a manner as to prevent independent vibration or movement. Within the upper half of the lamp casing, is located a number of arch-shaped baffle plates respectively designated by the numerals 24, 25, 26 and 27. The lower edges of these arches lie approximately in a plane passed horizontally through the axis of the lamp. These plates, as they extend upwardly to form the arches, are inclined, whereby the rear edges are higher than their forward edges, the inclination of the series of arch-shaped plates being such that the rays of light from the lamp reflector 28 will be reflected to the ground at approximately the same distance in front of the lamp. In other words, the uppermost arch-shaped plate 24 has the greatest degree of inclination, while the inclination of the other plates diminishes in degree downwardly. The inclination of all of these plates is such that the rays passing from the upper half of the reflector 28, will all be reflected downwardly, and caused to strike the ground a comparatively short distance forward of the machine, their direction being such that it is impossible for the rays from the upper half of the reflector to annoy people in the vicinity of the lamp. Within the lower half of the casing 5, a series of vertically disposed parallel plates 29 are located, their lower edges being secured to the inner surface of the casing, while their upper extremities are secured to the arch shaped plates 24 to 27, inclusive. For instance, the nine centrally located plates 29 have their upper extremities connected with the lowermost arch-shaped plate 27. The two outermost plates of this central series, are connected with the rear edges of the arch 27, while the intermediate plates are connected with the higher portions of the arch, according to their location. Consequently, the center plate of this series is the longest, while the other plates diminish in length downwardly to the extremities of the arch. From this it will be understood that a relatively large number of these plates extend above the horizontal center of the casing, thus further facilitating the baffling or dimming action of my improved construction. Again, as illustrated in the drawing, four of the plates 29 are connected at their upper extremities with the arch-shaped plate 26, two of these last named plates 29 being arranged on each side of the series of plates 29 connected with the arch-shaped plate 27. In the same manner, four of the plates 29 are connected with the arch-shaped plates 25 and four others with the arch-shaped plate 24, the arrangement of the two pairs of plates 29 connected with each arch-shaped plate 24 being the same as heretofore explained in speaking of the plates 29 connected with the arch-shaped plate 26.

By referring to Fig. 3, it may be assumed that the six parallel members constitute a corresponding number of plates 29 of my improved construction, and that 30 designates a point from which rays of light issue from the lamp or reflector in the direction of the said plates. The dotted lines 31 diverge from the point 30 and the space indicated by the transversely arranged dotted line 32, indicates the greatest horizontal area exposed to the direct reflection of the rays of light where my improved device is employed. In other words, assuming that a person is in front of the lamp and standing anywhere beyond the extremities of the transverse line 32, in the direction of said line, the directly reflected rays cannot be seen. Hence, it is only within a comparatively narrow area in front of the lamp that these directly reflected rays could strike the eye, even if the eye were low enough to receive rays from the lower half of the illuminating device. This view illustrates the advantage of the vertically disposed parallel plates 29 of my improved lamp dimmer.

As illustrated in Fig. 2 of the drawing, it is assumed that the lamp, which may be designated in its entirety by the numeral 33, is the ordinary electric lamp employed in automobiles. Hence it is unnecessary that the same should be described more in detail.

From the foregoing description, the use of my improved lamp dimmer will be readily understood. In order to prepare the ordinary lamp 33 for use with my improved dimmer, it is only necessary to apply two angle brackets 19 to the casing of the lamp. In applying my device, it must be understood that the bolts 17 are hinged or pivoted on the pins 15 which connect the bolts with the angle bracket 10. Hence, in attaching the dimmer to the lamp, it will only be necessary to throw the bolts 17 into the slots 18 of the two lamp brackets, and then apply the nuts 21 to the rearwardly protruding threaded extremities of these bolts, and screw the nuts sufficiently tight for securing purposes.

While the arch-shaped plates 24 to 27, inclusive, may be continuous, as illustrated in the drawing, the centrally located vertically disposed parallel plate 29 is extended upwardly as shown at 34 and is connected with the casing 5 at both top and bottom. When this form of construction is used, the arch-shaped plates 24 to 27, inclusive, are made in two parts, and their upper edges are soldered, or otherwise secured to the extension 34 of the central plate 29. It is evident, however, that the invention is not limited to the details of construction herein shown and described, as many modifications may be employed within the scope of the appended claims.

Having thus described my invention, what I claim is,—

1. A dimmer for automobile lamps comprising a casing the latter provided with a number of arch-shaped plates arranged one above another and suitably spaced in its upper part, said plates being variably inclined downwardly from their rear edges.

2. A lamp dimmer comprising a casing adapted to occupy a position in front of the lamp and provided with an arch-shaped baffle plate located in the upper half of the casing and downwardly inclined from its rear extremity, and a number of vertically disposed baffle plates arranged in parallel relation and suitably spaced in the lower part of the casing, substantially as described.

3. A lamp dimmer comprising a casing, the latter provided with a number of arch-shaped plates located in the upper portion thereof, and a number of flat baffle plates arranged in its lower part.

4. A lamp dimmer comprising a casing, said casing provided with arch-shaped baffle plates located in the upper half of the casing and downwardly inclined from their rear extremities, and a number of vertically disposed baffle plates arranged in parallel relation and suitably spaced in the lower part of the casing, substantially as described.

5. A dimmer for automobile lamps comprising a number of arch-shaped plates arranged in the upper portion of the lamp, and a number of flat baffle plates arranged in the lower portion of said lamp, substantially as described.

In testimony whereof I affix my signature in presence of two witnesses.

JOHN D. CARTER.

Witnesses:
MAZE KIRBY,
A. EBERT O'BRIEN.